United States Patent
Caseau

(10) Patent No.: US 10,547,572 B2
(45) Date of Patent: Jan. 28, 2020

(54) MESSAGING SERVICE

(71) Applicant: Orange, Paris (FR)

(72) Inventor: Francois Caseau, Paris (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/382,003

(22) Filed: Dec. 16, 2016

(65) Prior Publication Data

US 2017/0180282 A1 Jun. 22, 2017

(30) Foreign Application Priority Data

Dec. 18, 2015 (FR) ...................................... 15 62851

(51) Int. Cl.
*H04L 12/58* (2006.01)
*H04L 29/08* (2006.01)
*H04M 3/533* (2006.01)
*H04W 8/20* (2009.01)
*H04M 3/53* (2006.01)

(52) U.S. Cl.
CPC ............ *H04L 51/046* (2013.01); *H04L 51/02* (2013.01); *H04L 51/22* (2013.01); *H04L 67/306* (2013.01); *H04M 3/53341* (2013.01); *H04W 8/20* (2013.01); *H04M 3/5307* (2013.01)

(58) Field of Classification Search
CPC ............... H04L 9/0894; H04L 65/1069; H04L 65/1073; H04L 63/0407
See application file for complete search history.

(56) References Cited

U.S. PATENT DOCUMENTS

| 8,693,655 | B1 | 4/2014 | Chau et al. | |
|---|---|---|---|---|
| 2002/0002591 | A1* | 1/2002 | Ketola | H04L 51/24 709/206 |
| 2011/0306330 | A1* | 12/2011 | Sharp | H04M 1/57 455/417 |
| 2012/0106719 | A1* | 5/2012 | Hillier | H04M 3/42008 379/93.02 |

(Continued)

OTHER PUBLICATIONS

English translation of the French Partial Preliminary Search Report dated Aug. 22, 2016 for corresponding French Application No. 1562851, filed Dec. 18, 2015.

(Continued)

*Primary Examiner* — Dung Hong
(74) *Attorney, Agent, or Firm* — David D. Brush; Westman, Champlin & Koehler, P.A.

(57) ABSTRACT

A method is provided for allocating a messaging mailbox located in a communications network to a user. The method performs the following actions in a messaging mailbox management device: receiving from a communication terminal, via the communications network, a request for a messaging mailbox, the request including user identification information, the identification information being different from a contact identifier of the user that can be reached on a communications network of a telecommunications operator to which the user subscribes; recording the received identification information in association with a messaging mailbox identifier; and sending a message in reply to the request, via the communications network, to the communication terminal. The message includes the messaging mailbox identifier.

9 Claims, 6 Drawing Sheets

(56) References Cited

U.S. PATENT DOCUMENTS

| | | | | |
|---|---|---|---|---|
| 2012/0106728 A1* | 5/2012 | Ghaffari | ............ | H04M 3/42272 |
| | | | | 379/211.02 |
| 2012/0177189 A1* | 7/2012 | Chatterjee | ......... | H04M 3/42059 |
| | | | | 379/93.17 |
| 2013/0183949 A1* | 7/2013 | Sulmar | ............... | H04L 63/0421 |
| | | | | 455/415 |
| 2015/0181025 A1* | 6/2015 | McBride | ........... | H04M 3/42008 |
| | | | | 455/413 |
| 2015/0334228 A1* | 11/2015 | Chau | .................. | H04M 15/887 |
| | | | | 379/142.01 |

OTHER PUBLICATIONS

English translation of the French Written Opinion dated Aug. 22, 2016 for corresponding French Application No. 1562851, filed Dec. 18, 2015.

\* cited by examiner

MESSAGING SERVICE

CROSS-REFERENCE TO RELATED APPLICATIONS

This application is claims priority to and the benefit of French Patent Application No. FR 1562851, filed Dec. 18, 2015, which is incorporated by reference in its entirety.

TECHNICAL FIELD

The present invention relates to messaging services, which offer the allocation of a messaging mailbox to a user of a communication terminal and the processing of the messages deposited in said mailbox. More particularly, it relates to messaging services used in communication services which protect the anonymity of the user.

TECHNICAL BACKGROUND

In the field of telecommunications, messaging services are very widely used.

In particular, most telecommunications operators offer their subscribers a voice messaging service. If a subscriber having this service cannot be reached, for example if his terminal is switched off or outside network coverage, if his line is busy or unconditionally switched to voice messaging, or if the user simply refuses to take the call, the caller wishing to reach the subscriber can then record a voice message in a voice messaging mailbox offered by the telecommunications operator to which the subscriber is signed up. This messaging service then notifies the subscriber of the presence of a new message in his voice messaging mailbox.

Some telecommunications operators also offer their subscribers a multimedia messaging service. This service can be used, notably, to receive large messages containing images, sound, text or video. This type of service is provided by a multimedia messaging server which enables multimedia messages to be transmitted from and received at any communication terminal comprising a suitable communication interface for communicating with the multimedia messaging service, and a multimedia message composition and reading interface. This service may be deployed on any type of fixed or mobile communications network, such as the internet, administered by the telecommunications operator to which the subscriber has signed up.

A drawback of the aforesaid messaging services is that they are very highly integrated into the infrastructure of the telecommunications operators who offer them. For this purpose, voice or multimedia messaging servers have special interfaces which communicate with devices in the architecture of the telecommunications network administered by the telecommunications operator, such as the HLR (Home Location Register) database which stores the subscriber identification information, the VLR (Visitor Location Register) database which temporarily stores the data on all the subscribers belonging to the geographic surface controlled by this architecture, or possibly the AuC (Authentication Centre) which is responsible for checking whether or not a service offered by a telecommunications operator is requested by an authorized subscriber.

Therefore, if the subscriber has contact identifiers other than a contact identifier assigned by the subscriber's telecommunications operator, such as a mobile or fixed telephone number, the telecommunications operator is unable to allocate a messaging mailbox associated with these other contact identifiers which it does not itself manage. Examples of other such contact identifiers include a SIP (Session Initiation Protocol) address, a WebRTC (Web Real-Time Communication) identifier, an instant messaging identifier, and others.

Usually, therefore, the subscriber has to disclose the contact identifier assigned to him by his telecommunications operator to anyone wishing to contact him, in order to benefit from a messaging service.

This results in a lack of flexibility in the use of existing messaging services.

Moreover, these messaging services are wholly unsuitable for the implementation of some services, notably communication services which protect the anonymity of a user who wishes to send or receive a message from his communication terminal. For this purpose, these communication services offer to allocate a secondary contact identifier to the terminal of the user, who already has a main contact identifier. For example, if the user has a mobile communication terminal, the main contact identifier is an MSISDN ("Mobile Station International Subscriber Directory Number") identifier, which corresponds in a unique manner to the SIM ("Subscriber Identity Module") card that is provided by the operator of the mobile network to which the user subscribes. More generally, a main contact identifier is assigned by the telecommunications operator to which the user subscribes. These anonymity protection services are offered, for example, when the user wishes to place an announcement on a dedicated internet site for this purpose, such as a small ads site, a dating site, a personal or professional social network, or the like. The user is then offered the chance to benefit from a secondary contact identifier which is not linked to the telecommunications operator to which the user has subscribed, and which enables the user to use this secondary contact identifier to communicate with any person who has left their details on the dedicated website, without the need to disclose the user's main contact identifier to this person.

The user of the anonymity protection service can be reached equally well on this secondary contact identifier. However, if the user does not respond to a communication made to his secondary contact identifier, because his terminal is switched off or outside network coverage, or because he does not wish to reply to the communication, or because he is on line, the caller is unable to leave a message in a messaging mailbox associated with this secondary contact identifier. At best, the anonymity protection service may offer conditional call forwarding to a messaging mailbox associated with the main contact identifier of the user of the anonymity protection service. In the last-mentioned case, the welcome message of the messaging mailbox may disclose the name or the main contact identifier of the user of the anonymity protection service, thus making this service entirely useless.

SUMMARY OF THE INVENTION

An exemplary embodiment of the present invention proposes a method for allocating a messaging mailbox located in a communications network to a user.

This method is remarkable in that it performs the following actions in a messaging mailbox management device:
 receiving from a communication terminal, via the communications network, a request for a messaging mailbox, the request comprising user identification information, the identification information being different from a contact identifier of the user that can be reached on a communications network of a telecommunications operator to which the user subscribes, recording the received identification information in association with a messaging mailbox identifier, sending a message in reply to the request, via the communications network, to the communication terminal, the message comprising the messaging mailbox identifier.

This arrangement enables a messaging mailbox to be allocated very simply and rapidly to a given user, by associating in a unique way a messaging mailbox identifier with user identification information which is independent of any subscription of the user to a given telecommunications operator, and which is therefore different from a contact identifier that can be reached on a communications network administered by a telecommunications operator to which the user has subscribed.

According to a particular embodiment, where the user is a service provider, the user identification information contained in the request is an identifier of the service provider.

This arrangement enables a service provider, such as a support service for a national or international voluntary initiative, for example a campaign against world hunger, a cancer prevention campaign, sponsorship of a charitable association, or the like, to have a messaging mailbox assigned to it on the fly, without disclosing to users wishing to support the initiative any personal contact identifier linked to a subscription of the service provider to a telecommunications operator.

According to another particular embodiment, the user is a user of a service provider that owns the communication terminal, while also having a main contact identifier and a secondary contact identifier which have been previously recorded in association in the communication terminal, the main contact identifier being reachable on a communications network of a telecommunications operator to which the user subscribes, and the secondary contact identifier being different from any contact identifier that can be reached on a communications network of a telecommunications operator to which the user subscribes, and the user identification information contained in the request is an identifier of the service provider and an identifier of the user.

This arrangement advantageously enables a dedicated messaging mailbox to be associated with a given user when the latter uses a service to which he has previously subscribed.

Thus, for example, in an anonymity protection service to which the user has subscribed, and where the user has received a secondary contact identifier, as described above, for this purpose, the user can benefit from a messaging mailbox which is entirely dedicated to this secondary contact identifier and which can receive messages from anyone wishing to contact the user via this secondary contact identifier, while ensuring that the user's personal information, such as his name or main contact identifier, is not disclosed.

In yet another particular embodiment, the aforesaid allocation method comprises:

receiving from the communication terminal, via the communications network, a request for the configuration of a profile of the messaging mailbox associated with the messaging mailbox identifier, the request comprising the identifier of the messaging mailbox, returning to the communication terminal, via the communications network, a reply containing a messaging mailbox profile configuration form to be completed by the user, receiving in return from the communication terminal, via the communications network, a reply containing the completed messaging mailbox profile configuration form, the form containing a main contact identifier of the user, parameterizing the messaging mailbox, using information contained in the form and the main contact identifier of the user.

This arrangement enables the profile of the user owning the messaging mailbox to be configured very easily, via a simple exchange of messages, of the HTTP type for example, between the communication terminal and the messaging mailbox management device, by indicating the identifier of the messaging mailbox and a main contact identifier of the user intended to receive the notification of the deposition of messages in the messaging mailbox.

This arrangement is therefore much more flexible in use than that of the prior art, in which the user is obliged to compose a communication identifier associated with the messaging mailbox linked to his subscription to a telecommunications operator, then to configure his messaging mailbox by keystrokes on his communication terminal or by activating a voice command on his communication terminal.

The various aforementioned embodiments or characteristics may be added, independently or in combination with one another, to the messaging mailbox allocation method as defined above.

The invention also relates to a method of processing the deposition of a message by a user, called the "depositing user", in a messaging mailbox that has been previously allocated to a user, called the "owner user", according to the allocation method of the invention.

This processing method is remarkable in that, after the owner user has provided the depositing user with a secondary contact identifier recorded previously, in a messaging mailbox management device, in association with a messaging mailbox identifier allocated to the owner user, the secondary contact identifier being different from any contact identifier that can be reached on a communications network of a telecommunications operator to which the owner user subscribes, the following actions are performed in the messaging mailbox management device:

intercepting a communication made by a communication terminal of the depositing user, called the "depositing terminal", this communication having been directed to the secondary contact identifier, routing the communication to the messaging mailbox, using the identifier of the messaging mailbox corresponding to the secondary contact identifier of the owner user, receiving the message deposited by the depositing terminal in the messaging mailbox corresponding to the messaging mailbox identifier allocated to the owner user, sending a message deposition notification to a main contact identifier of the owner user which has previously been recorded in the messaging mailbox management device, in association with the secondary contact identifier and the messaging mailbox identifier allocated to the owner user, the main contact identifier being reachable on a communications network of a telecommunications operator to which the owner user subscribes.

By means of this arrangement, the deposition of messages in a messaging mailbox associated with the secondary contact identifier belonging to the user of the anonymity protection service can be authorized as part of an anonymity protection service offered to the user, and any message deposited in said messaging mailbox can be sent to the communication terminal of the user, which is associated with both the main contact identifier and the secondary contact identifier of this user.

The user of such a service can also use his communication terminal associated with a main contact identifier and a secondary contact identifier to read the messages deposited in the messaging mailbox whose identifier corresponds to the secondary contact identifier.

The invention also relates to a messaging mailbox management device, comprising a processing circuit which is arranged to allocate to a user a messaging mailbox located in a communications network.

This device is remarkable in that the processing circuit is also arranged for:
- receiving from a communication terminal, via the communications network, a request for a messaging mailbox, the request comprising user identification information, this identification information being different from a contact identifier of the user that can be reached on a communications network of a telecommunications operator to which the user subscribes,
- recording the received identification information in association with a messaging mailbox identifier, and
- sending a message in reply to the request, via the communications network, to the communication terminal, the message comprising the messaging mailbox identifier.

According to a particular embodiment, the processing circuit is also arranged to process the deposition of a message by a user, called the "depositing user", in a messaging mailbox which has previously been allocated to a user called the "owner user", the owner user having previously provided the depositing user with a secondary contact identifier recorded previously in a messaging mailbox management device, in association with a messaging mailbox identifier allocated to the owner user, the secondary contact identifier being different from any contact identifier that can be reached on a communications network of a telecommunications operator to which the owner user subscribes, the processing circuit also being arranged for:
- intercepting a communication made by a communication terminal of the depositing user, called the "depositing terminal", this communication having been directed to the secondary contact identifier,
- routing the communication to the messaging mailbox, using the identifier of the messaging mailbox corresponding to the secondary contact identifier of the owner user,
- receiving the message deposited by the depositing terminal in the messaging mailbox corresponding to the messaging mailbox identifier allocated to the owner user, and
- sending a message deposition notification to a main contact identifier of the owner user which has previously been recorded in the messaging mailbox management device, in association with the secondary contact identifier and the messaging mailbox identifier allocated to the owner user, the main contact identifier being reachable on a communications network of a telecommunications operator to which the owner user subscribes.

The invention also relates to a computer program for executing instructions in program code for performing the steps of the messaging mailbox allocation method or the message deposition processing method according to the invention, when the program is run on a messaging mailbox management device.

This program may use any programming language, and may be in the form of source code, object code, or a code intermediate between source and object code, such as a code in partially compiled form, or any other desirable form.

The invention also relates to a computer-readable recording medium on which a computer program is recorded, this program comprising appropriate instructions for the execution of the steps of the messaging mailbox allocation method or the message deposition processing method according to the invention, when the program is run on a messaging mailbox management device such as that mentioned above.

The recording media may be any entity or device capable of storing the program. For example, the medium may comprise a storage means such as a ROM, for example a CD-ROM or a microelectronic circuit ROM, a USB memory stick, or a magnetic recording means such as a hard disc.

On the other hand, the recording medium may be a transmissible medium such as an electrical or optical signal which may be routed via an electrical or optical cable, by radio or by other means. The program according to the invention can, in particular, be downloaded from a network such as the internet.

Alternatively, the recording medium may be an integrated circuit in which the program is incorporated, the circuit being adapted to execute, or to be used in the execution of, the steps of the method of allocating a messaging mailbox or the steps of the method of processing message deposition according to the invention.

BRIEF DESCRIPTION OF THE DRAWINGS

Other characteristics and advantages will be apparent from reading the embodiments described with reference to the drawings, in which.

DETAILED DESCRIPTION OF A FIRST EMBODIMENT

Figure 1A:
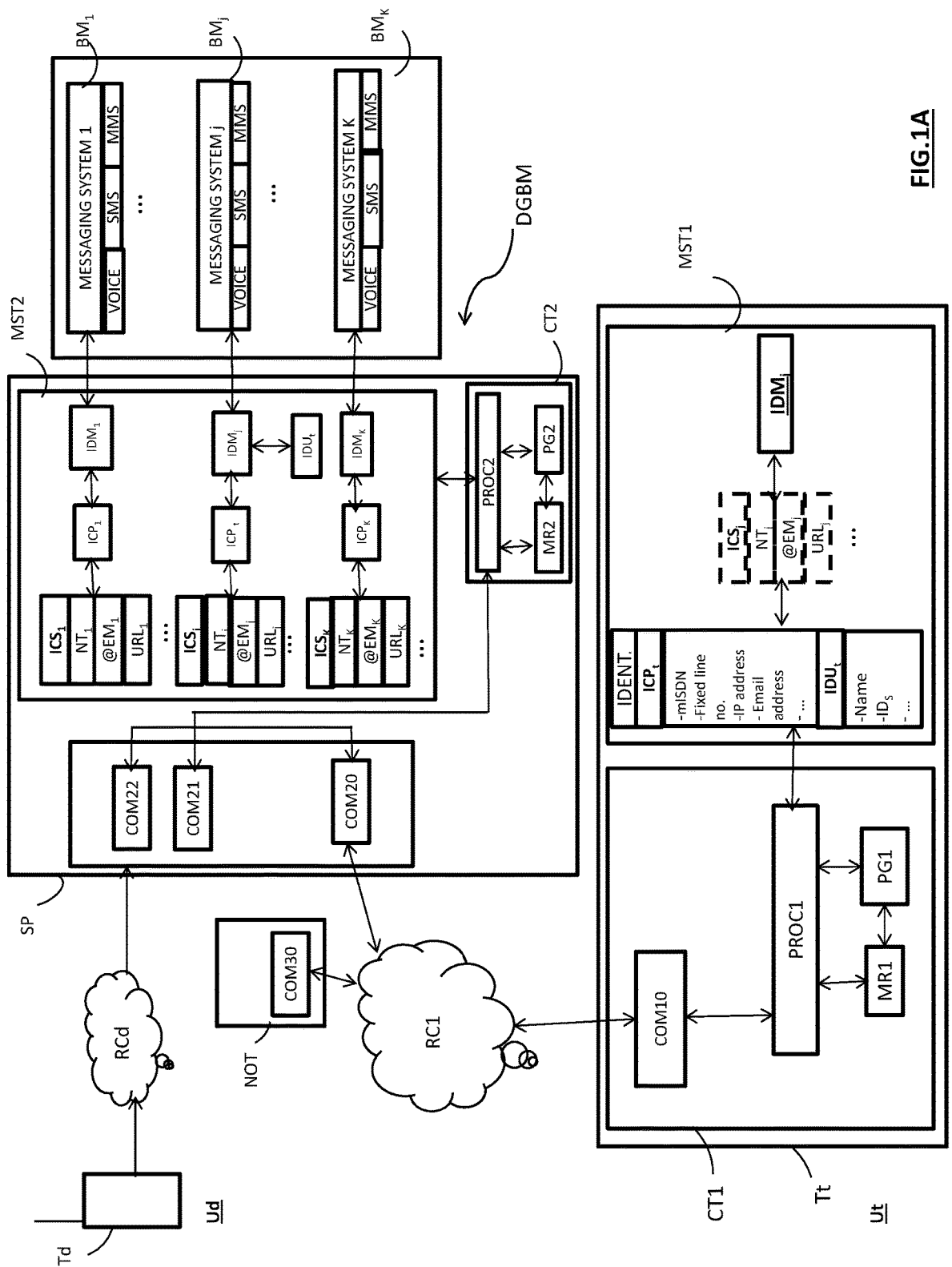
FIG. 1A is a schematic overall view of a messaging system according to the invention, in a first embodiment.

FIG. 1A shows schematically a messaging system which uses the method of allocating messaging mailboxes and processing message deposition according to a first embodiment. For the sake of clarity in FIG. 1A, some well-known elements of this system are not shown. These elements include, for example, servers, nodes, base stations, gateways and other entities of the telecommunications network used in this system.

The system comprises a communication terminal Tt, called the owner terminal, which can establish a communication with a messaging mailbox management device DGBM, via a communications network RC1.

In the illustrated example, the network RC1 is an extended network WAN ("Wide Area Network"), such as the internet.

The owner terminal Tt is, for example, a communications server belonging to an owner user Ut, such as a service provider which offers, for example, to support a national or international voluntary initiative, for example a campaign against world hunger, a cancer prevention campaign, sponsorship of a charitable association, or the like. For this purpose, the communications server Tt is adapted to receive messages of support from calling users. These messages may be voice, text or multimedia messages, depending on the type of terminals owned by these users. To avoid using an excessively large number of staff to reply to these messages in a synchronous manner, and/or to avoid disclosing their personal contact identifiers (such as a telephone number), the service provider allocates a messaging mailbox to the communications server Tt, as described below.

In a known way, the server Tt comprises hardware and/or software resources, particularly a processing circuit CT1 for establishing communications with the messaging mailbox management device, the processing circuit CT1 containing a processor PROC1 controlled by a computer program PG1.

On initialization, the code instructions of the computer program PG1 are, for example, loaded into a RAM memory, denoted MR1, before being executed by the processing circuit CT1.

The communications server Tt mainly comprises:
  a communication interface COM10, adapted to exchange messages, according to the HTTP protocol ("HyperText Transfer Protocol"), for example, with the messaging mailbox management device DGBM, via the communications network RC1,
  a storage module MST1, for example a database, containing:
    one or more main contact identifiers $ICP_t$, such as the mobile telephone number, the fixed line number, the IP address or the permanent email address of the service provider, said identifiers having been assigned to it by one or more telecommunications operators to which the service provider Ut has subscribed,
    identification information $IDU_t$ of the service provider, for example its name or a service identifier $ID_s$.

The communication interface COM10 and the storage module MST1 are controlled by the processor PROC1 of the processing circuit CT1.

According to the invention, a messaging mailbox identifier $IDM_j$ is first recorded, in association with the main contact identifier or identifiers $ICP_t$ and the identification information $IDU_t$ of the service provider Ut, in the memory MST1 of the server Tt.

The messaging mailbox identifier $IDM_j$ is, optionally, also recorded in association with a secondary contact identifier $ICS_j$ of the service provider in the memory MST1 of the server Tt. For this purpose, the secondary contact identifier $ICS_j$ is shown in broken lines in FIG. 1A.

The secondary contact identifier $ICS_j$ is designed to receive communications from calling users wishing to support the voluntary initiative. It may be, for example, a fixed or mobile telephone number $NT_j$, and/or an email address $@EM_j$, and/or an address $URL_j$ for accessing Web content, for example a URL ("Uniform Resource Locator") link, or the like. The secondary contact identifier is never a contact identifier by means of which the service provider Ut can be reached via a communications network of a telecommunications operator to which the service provider subscribes. As described in a later part of the description, the secondary contact identifier $ICS_j$ is first assigned by the messaging mailbox management device DGBM to the service provider Ut, in association with a messaging mailbox identifier $IDM_j$.

The validity of the secondary contact identifier $ICS_j$ preferably has a duration which is equal, for example, to the duration of subscription to the messaging service according to the invention, which itself is equal, in the illustrated example, to the duration of the support for the voluntary initiative. In a variant, the secondary contact identifier $ICS_j$ has a predetermined duration fixed in advance by the administrator of the messaging mailbox management device DGBM.

The messaging mailbox management device DGBM is a platform installed in the communications network RC1, which is designed, according to the invention, so that:
  it allocates, at the request of the owner terminal Tt, via the communications network RC1, a messaging mailbox associated with a unique messaging mailbox identifier $IDM_j$,
  it processes any request to deposit messages sent to the messaging mailbox corresponding to the messaging mailbox identifier $IDM_j$.

In a known way, the messaging mailbox management device DGBM comprises hardware and/or software resources, particularly a processing circuit CT2 for allocating to the service provider Tt a messaging mailbox located in the communications network RC1, and for processing the deposition of a message by a user in the messaging mailbox corresponding to the messaging mailbox identifier $IDM_j$, the processing circuit CT2 containing a processor PROC2 controlled by a computer program PG2.

On initialization, the code instructions of the computer program PG2 are, for example, loaded into a RAM memory, denoted MR2, before being executed by the processing circuit CT2.

The messaging mailbox management device DGBM mainly comprises:
  a first communication interface COM20 which operates, for example, according to the HTTP communications protocol, and which is adapted:
    to exchange messages, via the communications network RC1, with the communication interface COM10 of the communications server Tt of the service provider Ut,
    to send messages to a communication interface COM30 of a message deposition notification server, identified by the reference NOT in FIG. 1A,
    to receive multimedia messages from a communication terminal, called the depositing terminal Td, belonging to a depositing user Ud, via the communications network RCd to which the depositing user Ud subscribes,
  a second communication interface COM21 adapted to receive voice messages from the depositing terminal Td, via the communications network RCd,
  a third communication interface COM22 adapted to receive SMS ("Short Message Service") text messages from the depositing terminal Td, via the communications network RCd, and
  a plurality of messaging mailboxes $BM_1, BM_2, \ldots, BM_j, \ldots, BM_K$ ($1 \leq j \leq K$) adapted to store voice, SMS and multimedia messages.

According to the invention, the messaging mailbox management device DGBM comprises a server SP, of the proxy type for example, which comprises a storage module MST2, for example a database, containing a plurality of messaging mailbox identifiers $IDM_1, IDM_2, \ldots, IDM_j, \ldots, IDM_K$, associated respectively with the messaging mailboxes $BM_1, BM_2, \ldots, BM_j, \ldots, BM_K$.

Each of the messaging mailbox identifiers $IDM_1, IDM_2, \ldots, IDM_j, \ldots, IDM_K$ is also associated, respectively, with:

a corresponding main contact identifier $ICP_1, ICP_2, \ldots, ICP_t, \ldots, ICP_K$ of a corresponding owner user, a corresponding secondary contact identifier $ICS_1, ICS_2, \ldots, ICS_j, \ldots, ICS_K$ of a corresponding owner user Ut.

In the messaging system of FIG. 1A, the message deposition notification server NOT is also adapted to send a message deposition notification message to the server Tt, via the communications network RC1.

It should be noted that, even though the message deposition notification server NOT is not hosted in the messaging mailbox management device DGBM in the embodiment shown in FIG. 1A, but is still functionally connected to this device, this example is not limiting in any way.

In fact, in a variant embodiment, the messaging mailbox management device DGBM could indeed host the message deposition notification server NOT.

The communication interfaces COM20, COM21 and COM22, the storage module MST2, and the messaging mailboxes $BM_1, BM_2, \ldots, BM_j, \ldots, BM_K$ are controlled by the processor PROC2 of the processing circuit CT2.

Figure 2A:
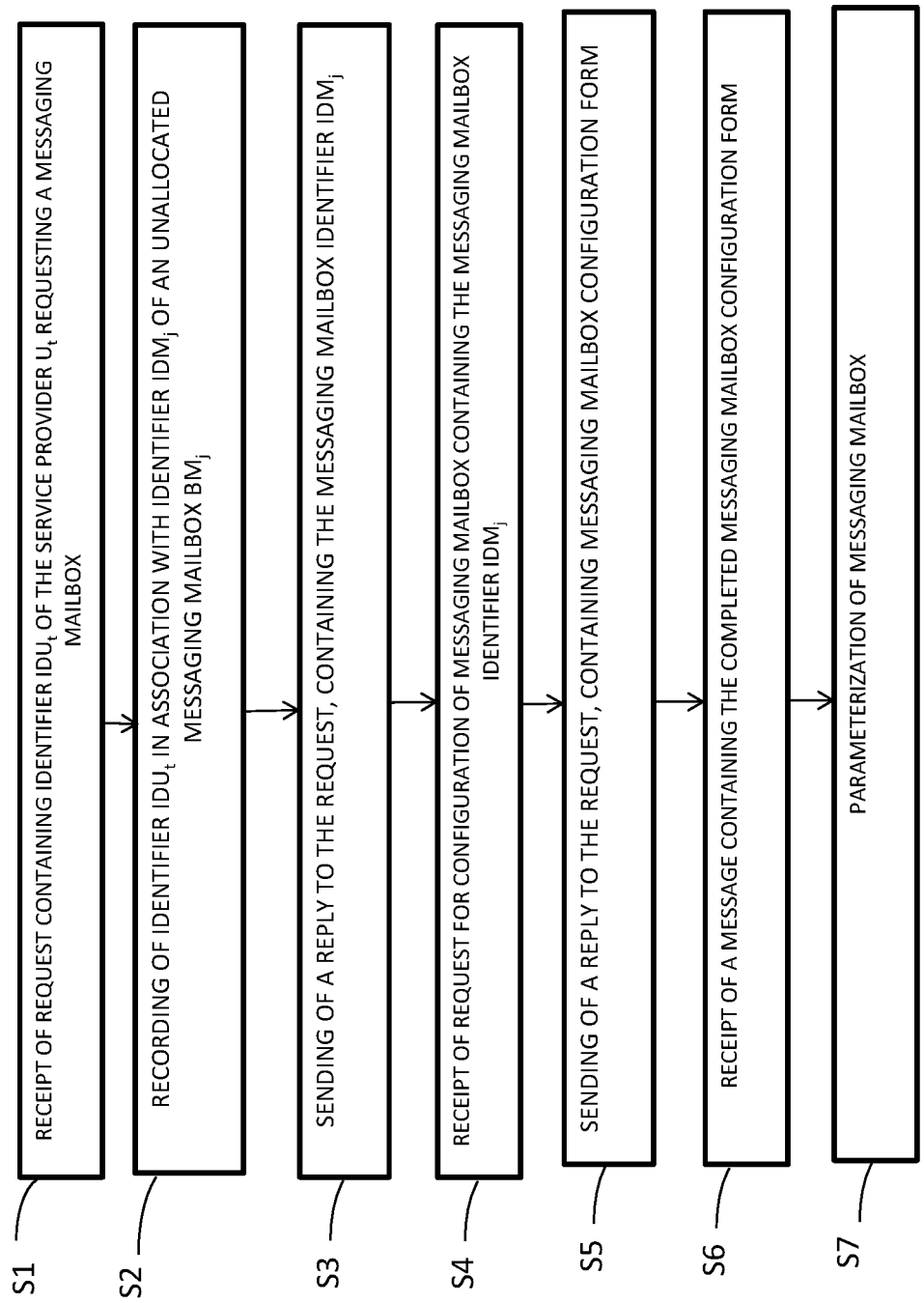
FIG. 2A shows the main steps of a method of allocating a messaging mailbox in the system of FIG. 1A.

With reference to FIGS. 1A and 2A, a description will now be given of the sequence of events in a method of allocating a messaging mailbox according to the invention, as used in the messaging mailbox management device DGBM.

The messaging mailbox allocation method is then executed as follows:

In S1, the messaging mailbox management device DGBM receives on its communication interface COM20, from the server Tt, via the communications network RC1, a request for a messaging mailbox which contains an identifier $IDU_t$ of the service provider Ut, as previously stored in the storage memory MST1 of the service provider Ut of FIG. 1A.

In the illustrated example, the request is of the HTTP type and is sent from the communication interface COM10 of the server Tt of the service provider Ut. This request is sent, either via a dedicated software application which has been previously downloaded to the server Tt, or via an intermediate web server located in the communications network RC1.

In S2, the messaging mailbox management device DGBM records the received identifier $IDU_t$ in the storage memory MST2, in association with a messaging mailbox identifier $IDM_j$ selected from a plurality of messaging mailbox identifiers $IDM_1, IDM_2, \ldots, IDM_j, \ldots, IDM_K$ stored in the memory MST2 of messaging mailbox management device DGBM, corresponding, respectively, to unallocated messaging mailboxes $BM_1, BM_2, \ldots, BM_j, \ldots, BM_K$.

In S3, the messaging mailbox management device DGBM, using the communication interface COM20, replies to the service provider's server Tt, via the communications network RC1, by sending a reply to the request received in S1, said reply containing the selected messaging mailbox identifier $IDM_j$.

On completion of this operation, a messaging mailbox $BM_j$ is allocated to the service provider Ut.

In S4, the messaging mailbox management device DGBM receives on its communication interface COM20, from the server Tt, via the communications network RC1, a request for configuration of the messaging mailbox $BM_j$, said configuration request containing the identifier $IDM_j$ of the messaging mailbox $BM_j$.

In the illustrated example, the request is of the HTTP type and is sent from the communication interface COM10 of the server Tt of the service provider Ut. This request is sent, either via a dedicated software application which has been previously downloaded to the server Tt, or via an intermediate web server located in the communications network RC1.

In S5, the messaging mailbox management device DGBM, using the communication interface COM20, replies to the service provider's server Tt, via the communications network RC1, by sending a reply to the request received in S4, said reply containing a messaging mailbox profile configuration form to be completed by the service provider Ut.

In S6, the messaging mailbox management device DGBM receives on its communication interface COM20, from the server Tt, via the communications network RC1, a message containing the completed messaging mailbox profile configuration form.

According to an exemplary embodiment, the configuration form consists of one or more web pages, on which the user Ut enters or ticks, in particular, the following information:

the message format types to be received: voice, SMS, MMS, MP3, MP4, JPEG, etc., the desired main contact identifier $ICP_t$ for receiving notifications of the deposition of messages recorded in the messaging mailbox $BM_j$, the desired type of message deposition notification: text (SMS, push, email, URL, etc.) or voice (special dial tone).

According to the above information, the user Ut selects at least one secondary contact identifier $ICS_j$ offered in the form, of the type described above in the description.

The user Ut is also able to access a server (not shown in FIG. 1A) by clicking on a URL link in the form, in order to record a voice or text welcome message for the messaging mailbox $BM_j$.

In S7, the messaging mailbox management device DGBM parameterizes the messaging mailbox $BM_j$ in accordance with the information contained in the received form, and associates the main contact identifier $ICP_t$, in the storage memory MST2, with the messaging mailbox identifier $IDM_j$.

On completion of this parameterization operation, the messaging mailbox $BM_j$ is ready to record any message deposited by a depositing user Ud.

Figure 3A:
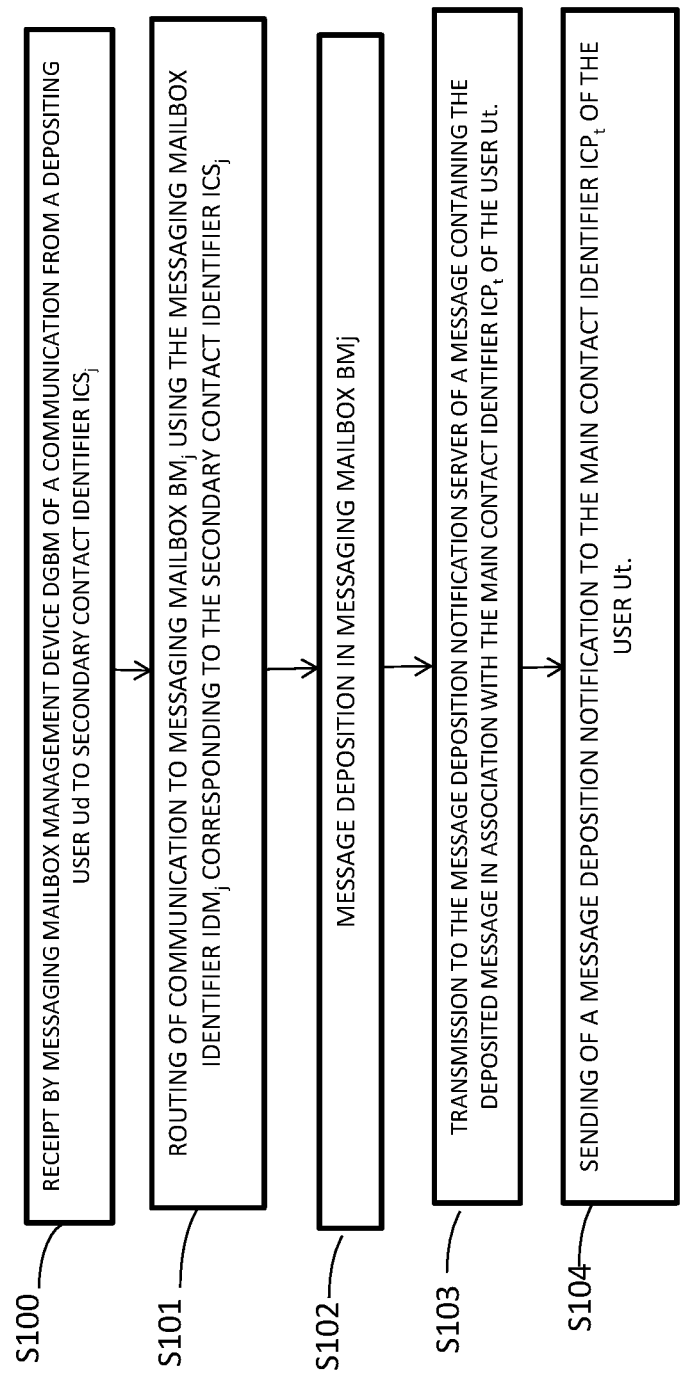
FIG. 3A shows the main steps of a method of processing message deposition in the system of FIG. 1A.

With reference to FIGS. 1A and 3A, a description will now be given of the sequence of events in a method of processing message deposition according to the invention, as used in the messaging mailbox management device DGBM.

In a preliminary step, the service provider Ut has communicated to the depositing user Ud the secondary contact identifier $ICS_j$ assigned to him by the messaging mailbox management device DGBM, so that the depositing user Ud can reach this contact identifier and deposit his message there. Depending on the communication capabilities of the communication terminal Td of the depositing user Ud, the service provider Ut communicates the telephone number $NT_j$ and/or the email address $@EM_j$ and/or the web address $URL_j$ to the depositing user Ud. According to an exemplary embodiment, these secondary contact identifier or identifiers $ICS_j$ are, for example, communicated to the depositing user Ud on a web page for supporting the voluntary initiative of the service provider Ut, available on the service provider's website.

In S100, the messaging mailbox management device DGBM receives a communication on one of its communication interfaces COM20, COM21 or COM22 from the terminal Td of a depositing user Ud, via the communications network RCd to which the terminal Td is attached.

If, for example, the depositing user makes a voice call from his terminal Td to the telephone number $NT_j$, the communication is received on the communication interface COM21.

If, for example, the depositing user sends an SMS call from his terminal Td to the telephone number $NT_j$, the communication is received on the communication interface COM22.

If, for example, the depositing user Ud sends an email from his terminal Td to the address $@EM_j$, this communication is received on the communication interface COM20.

If, for example, the depositing user Ud clicks on the web address $URL_j$ contained in the web page for supporting the voluntary initiative, this communication is also received on the communication interface COM20.

In S101, the received communication is routed to the messaging mailbox $BM_j$, using the messaging mailbox identifier $IDM_j$ recorded in the storage module MST2 in association with the secondary contact identifier $ICS_j$ of the owner user Ut.

In S102, after the launch of the welcome message, which may be of the visual or voice type, depending on the type of message to be deposited, the message deposited by the depositing terminal Td is received in the messaging mailbox $BM_j$.

Depending on the communication capabilities of the depositing terminal Td, the message may, for example, contain audio or text data, images, video, multimedia, or other data.

In a known way, the deposited message is associated with identification information of the depositing user Ud, such as his name, his telephone number, his email address, a pseudonym, or other information.

In S103, the messaging mailbox management device DGBM transmits to the interface COM30 of the message deposition notification server NOT, by means of its communication interface 20, via the communications network RC1, a message indicating that a message has been deposited in S102 in association with the main contact identifier $ICP_t$ of the service provider Ut and the type of message notification previously selected by the user Ut during the configuration of his messaging mailbox.

In S104, the message deposition notification server NOT then sends a message containing the notification of the deposition of said message directly to the main contact identifier $ICP_t$ of the server Tt.

Depending on the type of message deposition notification selected previously by the user Ut during the configuration of his messaging mailbox, and by way of non-limiting examples:

the notification is an SMS message or a voice call with a special dial tone, which is received on a fixed or mobile telephone number forming the main contact identifier $ICP_t$ of the server Tt, in which case said SMS or said call may directly contain the message deposited by the depositing user Ud, or may contain a voice menu for consulting the message deposited by the depositing user, the notification is an email received at the email address forming the main contact identifier $ICP_t$ of the server Tt, in which case said email may directly contain the message deposited by the depositing user Ud, or may contain a URL link for accessing the message in the messaging mailbox $BM_j$, the notification is a notification of the push or USSD ("Unstructured Supplementary Service Data") type, or of the URL type, received on the IP address forming the main contact identifier $ICP_t$ of the server Tt, in which case the push or USSD notification may directly contain the message deposited by the depositing user Ud, or alternatively contain a URL link for accessing the message in the messaging mailbox $BM_j$, and the URL notification provides direct access to the message in the messaging mailbox $BM_j$.

According to the messaging mailbox allocation method and the message deposition processing method described above, communications between the communication terminal Tt, the messaging mailbox management device and the notification server NOT may be secured by well-known authentication and encoding mechanisms.

The messaging mailbox $BM_j$ may, on the other hand, be deleted after a predetermined time interval recorded in the messaging mailbox management device DGBM, or at the request of the user Ut to the messaging mailbox management device, said request containing the messaging mailbox identifier $IDM_j$.

DETAILED DESCRIPTION OF A SECOND EMBODIMENT

A description will now be given, with reference to FIG. 1B, of a second embodiment of a messaging system which uses the method of allocating messaging mailboxes and processing message deposition according to a second embodiment.

Figure 1B:
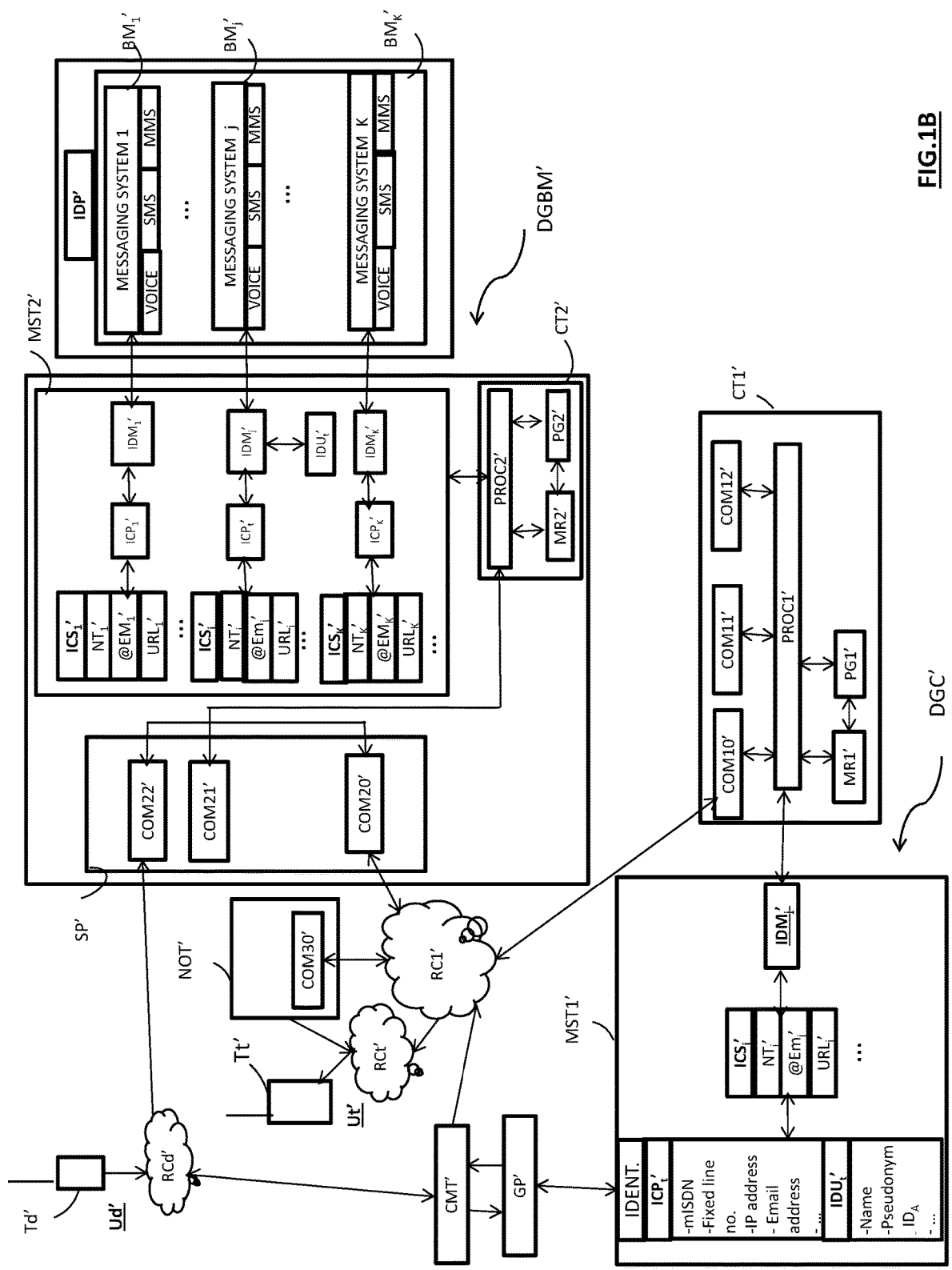
FIG. 1B is a schematic overall view of a messaging system according to the invention, in a second embodiment.

For the sake of clarity in FIG. 1B, some well-known elements of this system are not shown. These elements include, for example, servers, nodes, base stations, gateways and other entities of the telecommunications network used in this system.

The system comprises a communication terminal Tt', called the owner terminal, which can establish a communication with a messaging mailbox management device DGBM', via a communications network RC1'.

The system comprises a communication terminal Tt', called the owner terminal, which can establish a communication with a messaging mailbox management device DGBM', via a communications network RC1'.

In the illustrated example, the network RC1' is an extended network WAN ("Wide Area Network"), such as the internet.

In the illustrated example, the terminal Tt' may equally well be a mobile telephone comprising a SIM card having a unique subscriber identifier called an IMSI ("International Mobile Subscriber Identity"). In a known way, this identifier is used to identify the terminal Tt' in the communications network RCt' to which it is attached, that is to say the network to which the user Ut' of the terminal Tt' has subscribed. In the illustrated example, the network RCt' is of a mobile type, such as a GSM ("Global System for Mobile communications"), UMTS ("Universal Mobile Telecommunications System"), LTE ("Long Term Evolution") network, or other type. The identifier IMSI is associated with a main contact identifier MSISDN, denoted as $ICP_t'$, which is the telephone number used to reach the terminal Tt'.

Evidently, this example is not limiting. Thus, according to another example, the terminal Tt' is, for example, a fixed telephone attached to a PABX ("Private Automatic Branch Exchange").

Depending on the type of communications network RCt', the main contact identifier $ICP_t'$ of the terminal Tt' could be different from a telephone number. For example, it could be an email address, an IP address, a WebRTC ("Web Real-Time Communication") identifier, an instant messaging identifier, or another type.

The terminal Tt' can establish a communication, via a communications management server DGC', with a communication terminal Td', which also has a main contact identifier. This server DGC' contains a platform installed in the network which is designed so that:
- it processes any communication made by the terminal Tt' from its main contact identifier $ICP_t'$ to the terminal Td', and, conversely, it processes any communication made by the communication terminal Td' from its main contact identifier to the terminal Tt'.

In the illustrated example, the terminal Td' is a mobile telephone attached to a mobile communications network RCd'. However, the terminal Td' may equally well be a fixed telephone attached to a switched telecommunications network.

According to another example which is not shown, the communications networks RCt' and RCd' may form a single communications network belonging to a single telecommunications operator.

Additionally, in the present description, the term "communication" is taken to mean a conventional voice call or any other communication session of the data and/or audio and/or video type made by the terminal Tt' to the terminal Td', or, conversely, by the terminal Td' to the terminal Tt'.

According to the second embodiment, the terminal Tt' also has a secondary contact identifier $ICS_j'$ which has been previously assigned to it by a service provider (not shown), to which the user Ut' has subscribed, as part of an anonymity protection service offered by this service provider and administered by the communication management platform DGC'. As explained above in the description, this type of anonymity protection service is offered when the user wishes, for example, to place an announcement on a dedicated internet site for this purpose, such as a small ads site, a dating site, a personal or professional social network, or the like.

In the illustrated embodiment, the secondary contact identifier $ICS_j'$ is chosen from a pool of secondary call identifiers managed by the communication management platform DGC'.

In the illustrated example, the secondary contact identifier $ICS_j'$ is a fixed or mobile telephone number $NT_j'$. However, in a variant, depending on the type of communication that can be made by the terminal Tt', the secondary contact identifier $ICS_j'$ is, for example, an email address $@EM_j'$ and/or an address $URL_j'$ for accessing web content, for example a URL ("Uniform Resource Locator") link. The secondary contact identifier is never a contact identifier by means of which the user Ut' can be reached via a communications network of a telecommunications operator to which the service provider subscribes. The secondary contact identifier $ICS_j'$ is designed to receive communications from users calling the user Ut'. As described in a later part of the description, the secondary contact identifier $ICS_j'$ is first assigned by the messaging mailbox management device DGBM' of the communication management platform DGC', in association with a messaging mailbox identifier $IDM_j'$.

The validity of the secondary contact identifier $ICS_j'$ preferably has a duration which is equal, for example, to the duration of subscription to the messaging service according to the invention, which is itself equal, in the illustrated example, to the duration of the anonymity protection service offered by the service provider. In a variant, the secondary contact identifier $ICS_j'$ has a predetermined duration fixed in advance by the administrator of the messaging mailbox management device DGBM'.

The secondary contact identifier $ICS_j'$ has, for example, been assigned in connection with the deposition of an announcement on a dedicated website administered by a service provider. In the context of a website dedicated to private individuals, the announcement may be, for example, an advertisement for the sale of goods or services, deposited by the user Ut'. In the context of a social network, it may be, for example, an announcement describing the personal or professional career of the user Ut'. In the context of a communication service dedicated to a business, it may be, for example, an announcement deposited by the user Ut' who is an employee of the business, to be made available to the user Ud' who is also an employee of the business.

According to one embodiment, the communication management platform DGC' comprises hardware and/or software resources, particularly a processing circuit CT1' for providing communication management between the terminal Tt' and the terminal Td', the processing circuit CT1' containing a processor PROC1' controlled by a computer program PG1'.

On initialization, the code instructions of the computer program PG1' are, for example, loaded into a RAM memory, denoted MR1', before being executed by the processing circuit CT1'.

The communication management platform DGC' mainly comprises:
- a first communication interface COM10' which is adapted to exchange messages using the HTTP protocol, for example, with:
  - the messaging mailbox management device DGBM' via the communications network RC1',
  - the terminal Tt', via the network RCt' and/or RC1' or any other suitable network,
  - a service provider to which the user UTt' has subscribed,
- a second communication interface COM11' which is adapted to communicate with the terminals Tt' and Td', and which, in the illustrated example, is a communication interface adapted to send or receive voice calls,
- a third communication interface COM12' which is adapted to communicate with the terminals Tt' and Td', and which, in the illustrated example, is a communication interface adapted to send or receive SMS ("Short Message Service") text messages, or MMS ("Multimedia Messaging Service") multimedia messages,
- a profile manager GP' adapted to manage the profile of the user Ut' of the terminal Tt',
- a storage module MST1', for example a database, linked to the profile manager GP' and containing:
  - one or more main contact identifiers $ICP_t'$, such as the mobile telephone number, the fixed line number, the IP address or the permanent email address of the user Ut', said identifiers having been assigned to it by one or more telecommunications operators to which the user Ut' subscribes, identification information $IDU_t'$ of the user Ut', such as his name, his pseudonym, and an identifier $ID_A$ of the announcement that the user Ut' has deposited with the service provider.

The communication interfaces COM10', COM11' and COM12', the storage module MST1', and the profile manager GP' are controlled by the processor PROC1' of the processing circuit CT1'.

According to the invention, a messaging mailbox identifier $IDM_j'$ is first recorded in the memory MST1' of the communication management platform DGC', in association with:

the main contact identifier or identifiers $ICP_t'$,
the identification information $IDU_t'$ of the user Ut',
a secondary contact identifier $ICS_j'$ of the user Ut'.

The profile manager GP' is connected to a switching centre CMT' which is adapted to process the path of the communication made from the terminal Tt' to the terminal Td', and vice versa.

The switching centre CMT' is well known. In the illustrated example, it is, for example, a mobile switching centre "MSC" (Mobile Switching Centre) of a mobile telecommunications network. According to another embodiment in which the terminal Tt' is of a fixed type, the switching centre CMT' could be a local exchange of a fixed telecommunications network. It should be noted that, in the fixed telecommunications network, the local exchange handles local calls between subscribers of the same exchange, together with incoming and outgoing traffic with other exchanges.

The switching centre CMT' is characterized by two main functions.

The first main function is a call control function, corresponding to the central function of a telephone exchange. This function uses various operations such as the decoding of address information and the routing of telephone calls from a calling terminal to a called terminal. This function is associated with certain call functions such as:

call queuing,
call forwarding to a messaging system operated by the messaging mailbox management device DGBM', when the called terminal Tt' is hung up,
a special tone indicating to a calling user Ud' that the user Ut' is already on line or cannot be reached.

This first function also processes the signalling level established during the communication between the two terminals, that is to say the level corresponding to the signalling of the messages exchanged via the various entities of the communications network.

The second main function is a "media" function, for processing the whole media portion of the communication between the two terminals. This function corresponds to the media level of the processing of the text and/or audio and/or image/video data exchanged between the two terminals during the communication.

It should be noted that, although the profile manager GP' and the switching centre CMT' are both hosted in the communication management platform DGC' in the embodiment shown in FIG. 1B, this example is not limiting in any way.

In fact, in a variant embodiment, the communication management platform DGC' could contain only the profile manager GP', the switching centre CMT' being hosted at another location in the network while still being connected functionally to the profile manager GP'.

The messaging mailbox management device DGBM' is a platform installed in the communications network RC1', which is designed, according to the invention, so that:

it allocates, at the request of the communication management platform DGC', via the communications network RC1', a messaging mailbox associated with a unique messaging mailbox identifier $IDM_j'$, and it processes any request to deposit messages sent to the messaging mailbox corresponding to the messaging mailbox identifier $IDM_j'$.

In a known way, the messaging mailbox management device DGBM' comprises hardware and/or software resources, particularly a processing circuit CT2' for allocating to the user Ut' a messaging mailbox located in the communications network RC1', and for processing the deposition of a message by a user Ud' in the messaging mailbox corresponding to the messaging mailbox identifier $IDM_j'$, the processing circuit CT2' containing a processor PROC2' controlled by a computer program PG2'.

On initialization, the code instructions of the computer program PG2' are, for example, loaded into a RAM memory, denoted MR2', before being executed by the processing circuit CT2'.

The messaging mailbox management device DGBM' mainly comprises:

a first communication interface COM20' which operates, for example, according to the HTTP communications protocol, and which is adapted:
to exchange messages, via the communications network RC1', with the communication interface COM10' of the communication management platform DGC',
to send messages to a communication interface COM30' of a message deposition notification server, identified by the reference NOT' in FIG. 1B,
to receive multimedia messages from the communication terminal Td', via the communications network RCd' to which the depositing user Ud' subscribes, a second communication interface COM21' adapted to receive voice messages from the depositing terminal Td', via the communications network RCd', a third communication interface COM22' adapted to receive SMS ("Short Message Service") text messages from the depositing terminal Td', via the communications network RCd', and a plurality of messaging mailboxes $BM_1'$, $BM_2'$, ..., $BM_j'$, ..., $BM_K'$ ($1 \leq j \leq K$) adapted to store voice, SMS and multimedia messages.

According to the invention, the messaging mailbox management device DGBM' comprises a server SP', of the proxy type for example, which comprises a storage module MST2', for example a database, containing a plurality of messaging mailbox identifiers $IDM_1'$, $IDM_2'$, ..., $IDM_j'$, ..., $IDM_K'$, associated respectively with the messaging mailboxes $BM_1'$, $BM_2'$, ..., $BM_j'$, ..., $BM_K'$.

Each of the messaging mailbox identifiers $IDM_1'$, $IDM_2'$, ..., $IDM_j'$, ..., $IDM_K'$ is also associated, respectively, with:

a corresponding main contact identifier $ICP_1'$, $ICP_2'$, ..., $ICP_t'$, ..., $ICS_K'$ of a corresponding owner user, a corresponding secondary contact identifier $ICS_1'$, $ICS_2'$, ..., $ICS_t'$, ..., $ICS_K'$ of a corresponding owner user.

In the messaging system of FIG. 1B, the message deposition notification server NOT' is also adapted to send a message deposition notification message to the terminal Tt' of the user Ut', via the communications network RCt'.

It should be noted that, even though the message deposition notification server NOT' is not hosted in the messaging mailbox management device DGBM' in the embodiment shown in FIG. 1B, but is still functionally connected to this device, this example is not limiting in any way.

In fact, in a variant embodiment, the messaging mailbox management device DGBM' could indeed host the message deposition notification server NOT'.

The communication interfaces COM20', COM21' and COM22', the storage module MST2', and the messaging mailboxes $BM_1'$, $BM_2'$, ..., $BM_j'$, ..., $BM_K'$ are controlled by the processor PROC2' of the processing circuit CT2'.

Figure 2B:
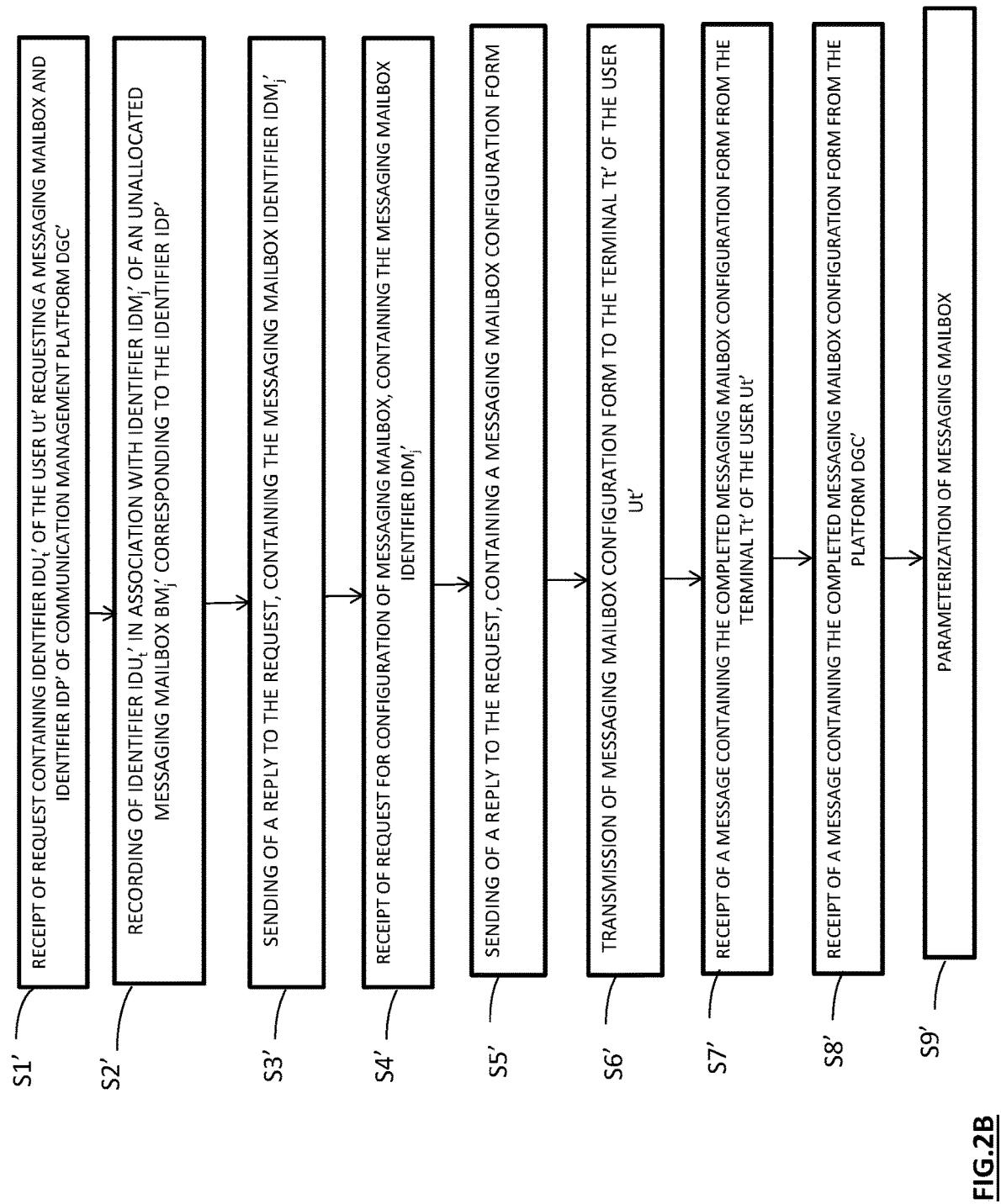
FIG. 2B shows the main steps of a method of allocating a messaging mailbox in the system of FIG. 1B.

With reference to FIGS. 1B and 2B, a description will now be given of the sequence of events in a method of allocating a messaging mailbox according to a second embodiment, as used in the messaging mailbox management device DGBM'.

Before this method is executed, the user Ut' has subscribed, notably in the course of depositing an announcement on a dedicated website, to an anonymity protection service administered by the communication management platform DGC' linked to the service provider which administers the dedicated website. Following this subscription, the user Ut' has communicated his main contact identifier or identifiers $ICP_t'$ to the platform DGC', together with his identification information $IDU_t'$, which have been recorded in the storage memory MST1' of the platform DGC', in association with one or more secondary contact identifiers $ICS_j'$ assigned by the platform DGC' to the user Ut'.

According to the invention, during this subscription, the user Ut' has also selected, in association with the secondary contact identifier or identifiers $ICS_j'$, a "messaging" option offered by the platform DGC'.

The messaging mailbox allocation method is then executed as follows:

In S1', the messaging mailbox management device DGBM' receives on its communication interface COM20', from the platform DGC', via the communications network RC1', a request for a messaging mailbox which contains an identifier IDP' of the platform DGC', together with an identifier $IDU_t'$ of the user Ut', as previously stored in the storage memory MST1' of the platform DGC'.

In the illustrated example, the request is of the HTTP type and is sent from the communication interface COM10' of the platform DGC'. This request is sent, either via a dedicated software application which has been previously downloaded to the platform DGC', or via an intermediate web server located in the communications network RC1'.

In S2', the messaging mailbox management device DGBM' records, in the storage memory MST2', the received identifier $IDU_t'$, in association with a messaging mailbox identifier $IDM_j'$ selected from a plurality of messaging mailbox identifiers $IDM_1'$, $IDM_2'$, ..., $IDM_j'$, ..., $IDM_K'$ stored in the memory MST2' of the messaging mailbox management device DGBM' and corresponding, respectively, to unallocated messaging mailboxes $BM_1'$, $BM_2'$, ..., $BM_j'$, ..., $BM_K'$, and corresponding to the identifier IDP' of the communication management platform DGC' offering the anonymity protection service.

In S3', the messaging mailbox management device DGBM', using the communication interface COM20', replies to the communication management platform DGC', via the communications network RC1', by sending a reply to the request received in S1', said reply containing the selected messaging mailbox identifier $IDM_j'$.

On completion of this operation, a messaging mailbox $BM_j'$ is allocated to the user Ut' of the terminal Tt', via the communication management platform DGC'.

In S4', the messaging mailbox management device DGBM' receives on its communication interface COM20', from the communication management platform DGC', via the communications network RC1', a request for configuration of the messaging mailbox $BM_j'$, said configuration request containing the identifier $IDM_j'$ of the messaging mailbox $BM_j'$.

In the illustrated example, the request is of the HTTP type and is sent from the communication interface COM10' of the platform DGC'. This request is sent, either via a dedicated software application which has been previously downloaded to the platform DGC', or via an intermediate web server located in the communications network RC1'.

In S5', the messaging mailbox management device DGBM', using the communication interface COM20', replies to the platform DGC', via the communications network RC1', by sending a reply to the request received in S4', said reply containing a messaging mailbox profile configuration form to be completed by the user Ut' of the terminal Tt'.

In S6', the communication management platform DGC', using its communication interface COM10', retransmits the configuration form for the messaging mailbox $BM_j'$ to the terminal Tt' via the communications networks RC1' and RCt'.

In S7', the communication management platform DGC' receives on its communication interface COM10', from the terminal Tt', via the communications networks RC1' and RCt', a message containing the completed messaging mailbox profile configuration form.

In S8', the messaging mailbox management device DGBM' receives on its communication interface COM20', from the platform DGC', via the communications network RC1', a message containing the completed messaging mailbox profile configuration form.

According to an exemplary embodiment, the configuration form consists of one or more web pages, on which the user Ut' enters or ticks, in particular, the following information:
- the message format types to be received: voice, SMS, MMS, MP3, MP4, JPEG, etc.,
- the desired main contact identifier $ICP_t'$ for receiving notifications of the deposition of messages recorded in the messaging mailbox $BM_j'$,
- the desired type of message deposition notification: text (SMS, push, email, URL, etc.) or voice (special dial tone).

According to the above information, the user Ut' selects at least one secondary contact identifier $ICS_j'$, which has previously been recorded in the platform DGC'.

The user Ut' is also able to access a server (not shown in FIG. 1B) by clicking on a URL link in the form, in order to record a voice or text welcome message for the messaging mailbox $BM_j'$.

In S9', the messaging mailbox management device DGBM' parameterizes the messaging mailbox $BM_j'$ in accordance with the information contained in the received form, and associates the main contact identifier $ICP_t'$, in the storage memory MST2', with the messaging mailbox identifier $IDM_j'$.

On completion of this parameterization operation, the messaging mailbox $BM_j'$ is ready to record any message deposited by a depositing user Ud'.

Figure 3B:
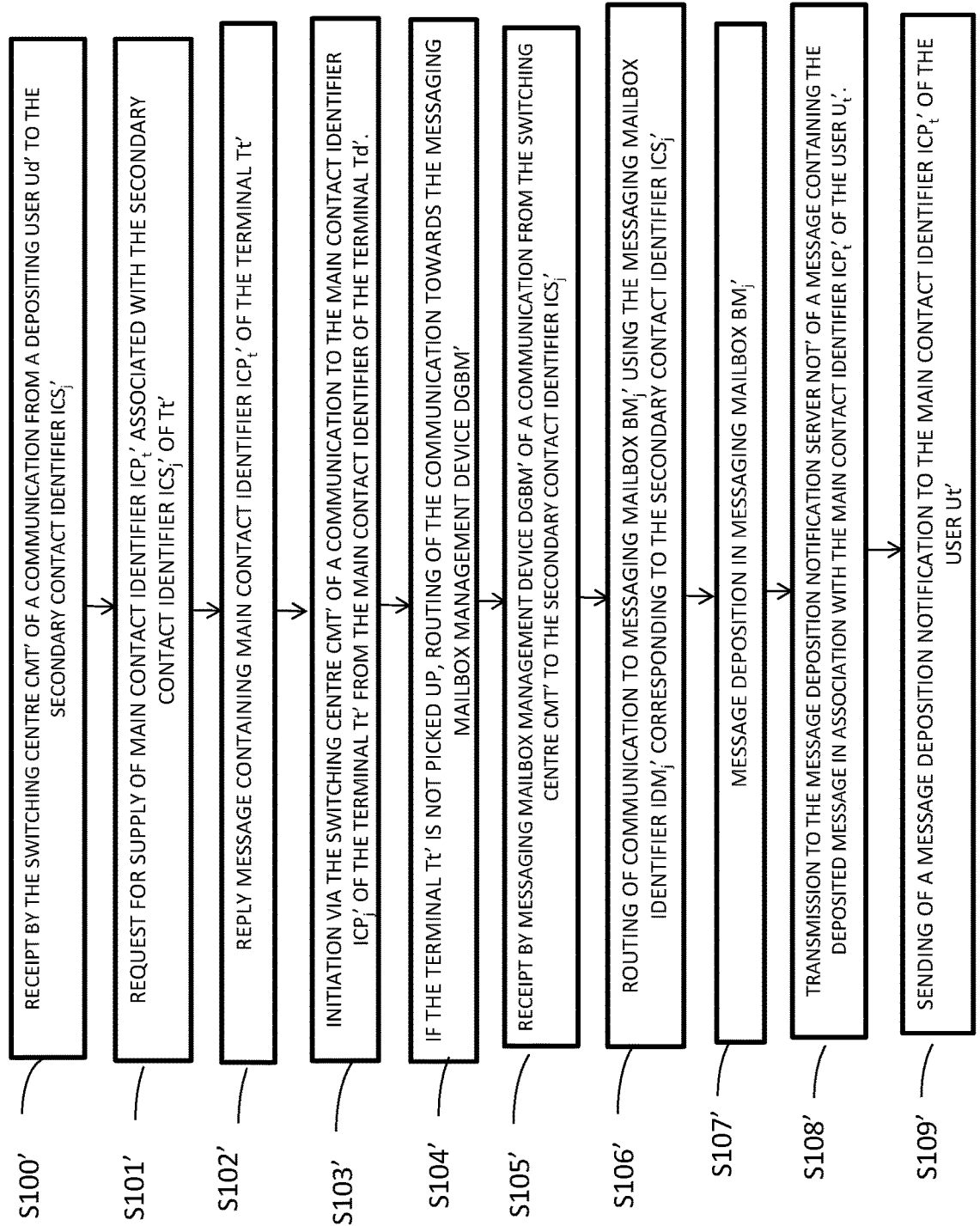
FIG. 3B shows the main steps of a method of processing message deposition in the system of FIG. 1B.

With reference to FIGS. 1B and 3B, a description will now be given of the sequence of events in a method of processing message deposition according to a second embodiment of the invention, as used in the messaging mailbox management device DGBM'.

In a preliminary step, the communication management platform DGC' has communicated a secondary contact identifier $ICS_j'$ to the owner user Ut', and the owner user Ut' has activated the call forwarding option to the messaging system $BM_j'$ which is offered by the communication management platform DGC' linked to the service provider who administers the website dedicated to the deposition of the announcement.

Also during this preliminary step, the depositing user Ud' has become aware of the secondary contact identifier $ICS_j'$, either because the owner user Ut' has communicated it to him beforehand, or because the depositing user Ud' is interested in the announcement deposited by the owner user Ut' on the service provider's website, and has made a note of the secondary contact identifier $ICS_j'$ associated with this announcement.

The secondary contact identifier $ICS_j'$ communicated to the depositing user Ud' may be the telephone number $NT_j'$, the email address $@EM_j'$ and/or the web address $URL_j'$, which the depositing user Ud' selects according to the communication capacities of the communication terminal Td' owned by him at the moment when a communication is made, via the communications network RCd' to which he belongs, to the owner terminal Tt'.

In S100', the communication made by the depositing terminal Td' is received by the switching centre CMT', via one of the communication interfaces COM10', COM11', COM12' of the platform DGC', according to the type of communication made by the depositing terminal Td'.

The switching centre CMT', which knows the secondary contact identifier $ICS_j'$ associated with the main contact identifier $ICP_t'$ of the owner terminal Tt', then identifies this communication as a first branch of the communication that can be established between the depositing terminal Td' and the owner terminal Tt'.

In S101', the switching centre CMT' sends a request to the profile manager GP' for the supply of the main contact identifier $ICP_t'$ of the owner terminal Tt', which has been previously recorded in association with the secondary contact identifier $ICS_j'$ in the storage module MST1' of the platform DGC'.

In S102', in reply to the request, the profile manager GP' sends a message containing the main contact identifier $ICP_t'$ of the terminal Tt' to the switching centre CMT'.

The exchanges between the switching centre CMT' and the profile manager GP' are, for example, in accordance with the SIP protocol.

On receipt of this message, in S103', the switching centre CMT' initiates a communication to the main contact identifier $ICP_t'$ of the terminal Tt', from the main contact identifier of the depositing terminal Td'. The switching centre CMT' then identifies this communication as a second branch of the communication to be established between the terminal Td' and the terminal Tt'.

If the terminal Tt' does not reply to the communication initiated at S103', for example because the owner user Ut' does not wish to pick up the phone, or because he is already on line, or because his terminal Tt' cannot be reached, the communication to the secondary contact identifier $ICS_j'$ is routed in S104' to the messaging mailbox management device DGBM', via the communications network RC1', by means of one of the communication interfaces COM10', COM11', COM12', according to the type of communication that has been made by the depositing terminal Td'.

In S105', the messaging mailbox management device DGBM' receives the communication routed on one of its communication interfaces COM20', COM21' or COM22', according to the type of communication initiated by the depositing terminal Td'.

If, for example, the depositing user makes a voice call from his terminal Td' to the telephone number $NT_j'$, the communication is received on the communication interface COM21'.

If, for example, the depositing user Ud' sends an SMS call from his terminal Td' to the telephone number $NT_j'$, the communication is received on the communication interface COM22'.

If, for example, the depositing user Ud' sends an email from his terminal Td' to the address $@EM_j'$, this communication is received on the communication interface COM20'.

If, for example, the depositing user Ud' clicks on the web address $URL_j'$ contained in the announcement deposited by the owner user Ut', this communication is also received on the communication interface COM20'.

In S106', the received communication is routed to the messaging mailbox $BM_j'$, using the messaging mailbox identifier $IDM_j'$ recorded in the storage module MST2' in association with the secondary contact identifier $ICS_j'$ of the owner user Ut'.

In S107', after the launch of the welcome message, which may be of the visual or voice type, depending on the type of message to be deposited, the message deposited by the depositing terminal Td' is received in the messaging mailbox $BM_j'$.

Depending on the communication capabilities of the depositing terminal, the message may, for example, contain audio or text data, images, video, multimedia, or other data.

In a known way, the deposited message is associated with identification information of the depositing user Ud', such as his name, his telephone number, his email address, a pseudonym, or other information.

In S108', the messaging mailbox management device DGBM' transmits to the interface COM30' of the message deposition notification server NOT', by means of its communication interface COM20', via the communications network RC1', a message indicating that a message has been deposited in S107' in association with the main contact identifier $ICP_t'$ of the user Ut' and the type of message notification previously selected by the user Ut' during the configuration of his messaging mailbox.

In S109', the message deposition notification server NOT' then sends a message containing the notification of the deposition of said message directly to the main contact identifier $ICP_t'$ of the user Ut'.

Depending on the type of message notification selected previously by the user Ut' during the configuration of his messaging mailbox, and by way of non-limiting examples:
  the notification is an SMS message or a voice call with a special dial tone, which is received on a fixed or mobile telephone number forming the main contact identifier $ICP_t'$ of the terminal Tt', in which case said SMS or said call may directly contain the message deposited by the depositing user Ud', or may contain a voice menu for consulting the message deposited by the depositing user,
  the notification is an email received at the email address forming the main contact identifier $ICP_t'$ of the terminal Tt', in which case said email may directly contain the message deposited by the depositing user Ud', or may contain a URL link for accessing the message in the messaging mailbox $BM_j'$,
  the notification is a notification of the push, USSD, or URL type, received on the IP address forming the main contact identifier $ICP_t'$ of the terminal Tt', in which case the push or USSD notification may directly contain the message deposited by the depositing user Ud', or alternatively contain a URL link for accessing the message in the messaging mailbox $BM_j'$, and the URL notification providing direct access to the message in the messaging mailbox $BM_j'$.

According to the messaging mailbox allocation method and the message deposition processing method described above, communications between the communication terminal Tt', the messaging mailbox management device DGBM' and the notification server NOT' may be secured by well-known authentication and encoding mechanisms.

The messaging mailbox $BM_j'$ may, on the other hand, be deleted after a predetermined time interval recorded in the messaging mailbox management device DGBM', or at the request of the user Ut' to the messaging mailbox management device, via the communication management platform DGC', said request containing the messaging mailbox identifier $IDM_j'$.

An exemplary embodiment of the present disclosure overcome drawbacks of the aforementioned prior art.

It goes without saying that the embodiments described above have been provided purely for guidance and in a non-limiting way, and numerous modifications may easily be made by those skilled in the art without departing from the scope of the invention.

The invention claimed is:

1. A method comprising:
   allocating on the fly a messaging mailbox located in a communications network to a user, wherein allocating comprises the following actions performed by a messaging mailbox management device:
   receiving from a communication terminal of a user unknown by said messaging mailbox management device, via the communications network, a request for a messaging mailbox, said request comprising only one user identification information, said identification information being different from an email of said user and from a contact identifier of said user that can be reached on a communications network of a telecommunications operator to which the user has subscribed,
   recording said only one received identification information in association with a messaging mailbox identifier selected by the messaging mailbox management device from a plurality of messaging mailbox identifiers stored in a memory of said messaging mailbox management device, corresponding, respectively, to unallocated messaging mailboxes, without receiving any contact identifier of the user that can be reached on a communications network, and
   sending a message in reply to the request for a messaging mailbox without a previous configuration by the user in said messaging mailbox management device, via the communications network, to the communication terminal, said message comprising the messaging mailbox identifier.

2. The method according to claim 1, wherein, the user being a service provider, said only one user identification information contained in the request is an identifier of the service provider.

3. The method according to claim 1, wherein, the user is a user of a service provider that owns said communication terminal, while also having a main contact identifier and a secondary contact identifier which have been previously recorded in association in said communication terminal, the main contact identifier being reachable on a communications network of a telecommunications operator to which the user has subscribed, and the secondary contact identifier being different from any contact identifier that can be reached on a communications network of a telecommunications operator to which the user has subscribed, and said only one user identification information contained in the request is an identifier of the service provider and an identifier of the user.

4. The method according to claim 1, comprising:
   receiving from the communication terminal, via the communications network, a request for the configuration of a profile of the messaging mailbox associated with said messaging mailbox identifier, the request comprising the identifier of the messaging mailbox,
   returning to the communication terminal, via the communications network, a reply containing a messaging mailbox profile configuration form to be completed by the user,
   receiving in return from the communication terminal, via the communications network, a reply containing the completed messaging mailbox profile configuration form, said form containing a main contact identifier of the user, and
   parameterizing the messaging mailbox, using information contained in the form and said main contact identifier of the user.

5. The method according to claim 1, further comprising:
   processing a deposition of a message by a user, called a "depositing user", in a messaging mailbox that has been previously allocated to a user, called an "owner user", according to the act of allocating,
   wherein processing the deposition comprises, after the owner user has provided the depositing user with a secondary contact identifier recorded previously, in the messaging mailbox management device, in association with a messaging mailbox identifier allocated to the owner user, said secondary contact identifier being different from any contact identifier that can be reached on a communications network of a telecommunications operator to which the owner user has subscribed, the following actions are performed in the messaging mailbox management device:
   intercepting a communication made by a communication terminal of the depositing user, called a "depositing terminal", this communication having been directed to said secondary contact identifier,
   routing the communication to the messaging mailbox, using the identifier of the messaging mailbox corresponding to the secondary contact identifier of the owner user,
   receiving the message deposited by the depositing terminal in the messaging mailbox corresponding to the messaging mailbox identifier allocated to the owner user, and
   sending a notification of said message deposition to a main contact identifier of the owner user which has previously been recorded in the messaging mailbox management device, in association with the secondary contact identifier and the messaging mailbox identifier allocated to the owner user, said main contact identifier being reachable on a communications network of a telecommunications operator to which the owner user has subscribed.

6. A messaging mailbox management device, comprising:
   a non-transitory computer readable medium; and
   a processing circuit, which is arranged to allocate on the fly to a user a messaging mailbox located in a communications network, wherein the processing circuit is also arranged to:
   receive from a communication terminal of a user unknown by said messaging mailbox management device, via the communications network, a request for a messaging mailbox, said request comprising only one user identification information, said identification information being different from an email of said user and from a contact identifier of said user that can be reached on a communications network of a telecommunications operator to which the user has subscribed, record in the non-transitory computer-readable medium said only one received identification information in association with a messaging mailbox identifier selected by the messaging mailbox management device from a plurality of messaging mailbox identifiers stored in a memory of said messaging mailbox management device, corresponding, respectively, to unallocated messaging mailboxes, without receiving any contact identifier of the user that can be reached on a communications network, and send a message in reply to the request for a messaging mailbox without a previous configuration by the user in said messaging mailbox management device, via the communications network, to the communication terminal, said message comprising the messaging mailbox identifier.

7. The device according to claim 6, wherein the processing circuit is also arranged to process the deposition of a message by a user, called a "depositing user", in a messaging mailbox which has previously been allocated to a user called an "owner user", the owner user having previously provided the depositing user with a secondary contact identifier recorded previously in the messaging mailbox management device, in association with a messaging mailbox identifier allocated to the owner user, said secondary contact identifier being different from any contact identifier that can be reached on a communications network of a telecommunications operator to which the owner user has subscribed, said processing circuit also being arranged to:

intercept a communication made by a communication terminal of the depositing user, called the "depositing terminal", this call having been directed to said secondary contact identifier, route the communication to the messaging mailbox, using the identifier of the messaging mailbox corresponding to the secondary contact identifier of the owner user, receive the message deposited by the depositing terminal in the messaging mailbox corresponding to the messaging mailbox identifier allocated to the owner user, and send a notification of said message deposition to a main contact identifier of the owner user which has previously been recorded in the messaging mailbox management device, in association with the secondary contact identifier and the messaging mailbox identifier allocated to the owner user, said main contact identifier being reachable on a communications network of a telecommunications operator to which the owner user has subscribed.

8. A non-transitory computer-readable recording medium on which is recorded a computer program comprising instructions in program code for performing a messaging mailbox allocation method when said program is run on a messaging mailbox management device, wherein the instructions configure the messaging mailbox management device to perform acts comprising:

allocating on the fly a messaging mailbox located in a communications network to a user, wherein allocating comprises:

receiving from a communication terminal of a user unknown by said messaging mailbox management device, via the communications network, a request for a messaging mailbox, said request comprising only one user identification information, said identification information being different from an email of said user and from a contact identifier of said user that can be reached on a communications network of a telecommunications operator to which the user has subscribed, recording said only one received identification information in association with a messaging mailbox identifier selected by the messaging mailbox management device from a plurality of messaging mailbox identifiers stored in a memory of said messaging mailbox management device, corresponding, respectively, to unallocated messaging mailboxes, without receiving any contact identifier of the user that can be reached on a communications network, and sending a message in reply to the request for a messaging mailbox without a previous configuration by the user in said messaging mailbox management device, via the communications network, to the communication terminal, said message comprising the messaging mailbox identifier.

9. The non-transitory computer-readable recording medium according to claim 8, wherein the instructions further configure the messaging mailbox management device to perform acts comprising:

processing a deposition of a message by a user, called a "depositing user", in a messaging mailbox that has been previously allocated to a user, called an "owner user", according to the act of allocating, wherein processing the deposition comprises, after the owner user has provided the depositing user with a secondary contact identifier recorded previously, in the messaging mailbox management device, in association with a messaging mailbox identifier allocated to the owner user, said secondary contact identifier being different from any contact identifier that can be reached on a communications network of a telecommunications operator to which the owner user subscribes, the following actions are performed in the messaging mailbox management device:

intercepting a communication made by a communication terminal of the depositing user, called a "depositing terminal", this communication having been directed to said secondary contact identifier, routing the communication to the messaging mailbox, using the identifier of the messaging mailbox corresponding to the secondary contact identifier of the owner user, receiving the message deposited by the depositing terminal in the messaging mailbox corresponding to the messaging mailbox identifier allocated to the owner user, and sending a notification of said message deposition to a main contact identifier of the owner user which has previously been recorded in the messaging mailbox management device, in association with the secondary contact identifier and the messaging mailbox identifier allocated to the owner user, said main contact identifier being reachable on a communications network of a telecommunications operator to which the owner user has subscribed.

* * * * *